(12) United States Patent
Nejime et al.

(10) Patent No.: US 9,313,541 B2
(45) Date of Patent: *Apr. 12, 2016

(54) BROADCASTING METHOD AND BROADCAST SIGNAL RECEIVING APPARATUS

(71) Applicant: HITACHI MAXELL, LTD., Osaka (JP)

(72) Inventors: Yoshito Nejime, Tokyo (JP); Kimiya Yamaashi, Ibaraki (JP)

(73) Assignee: HITACHI MAXELL, LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/291,115

(22) Filed: May 30, 2014

(65) Prior Publication Data

US 2014/0282782 A1  Sep. 18, 2014

Related U.S. Application Data

(63) Continuation of application No. 11/826,560, filed on Jul. 17, 2007, now Pat. No. 8,826,360, which is a continuation of application No. 09/380,784, filed as application No. PCT/JP98/02675 on Aug. 6, 1999, now Pat. No. 7,272,843.

(51) Int. Cl.
*H04N 7/16*  (2011.01)
*H04N 7/10*  (2006.01)
(Continued)

(52) U.S. Cl.
CPC ............ *H04N 21/431* (2013.01); *H04H 20/106* (2013.01); *H04H 20/40* (2013.01);
(Continued)

(58) Field of Classification Search
CPC ...................................................... H04N 21/812

USPC ....................................... 725/25, 32, 110, 134
See application file for complete search history.

(56) References Cited

U.S. PATENT DOCUMENTS 5,027,400 A   6/1991  Baji et al.
5,172,111 A * 12/1992  Olivo, Jr. ...................... 386/239
(Continued)

FOREIGN PATENT DOCUMENTS

DE   4228753   3/1993
GB   2131221   6/1984
(Continued)

OTHER PUBLICATIONS

U.S. Pat. No. 5,027,400 corresponds to JP 2-54646.
(Continued)

*Primary Examiner* — Gigi L Dubasky
(74) *Attorney, Agent, or Firm* — Brundidge & Stanger, P.C.

(57) ABSTRACT

A broadcasting method and a broadcast signal receiving apparatus is provided wherein auxiliary information, such as video and audio data for supplementing broadcast information presented through a broadcasting network in an interlocked manner can be watched and listened to by the viewer. Broadcast information received from a broadcasting network is temporarily stored in a storage means of a broadcast signal receiving apparatus and a recording medium for storing auxiliary information used as a supplement to the broadcast information is mounted on the broadcast signal receiving apparatus. The broadcast information and the auxiliary information are then played back in an interlocked manner with a predetermined timing. As a result, a function to present information which cannot be accommodated in a broadcast frame and a parental function can be implemented.

12 Claims, 6 Drawing Sheets

(51) Int. Cl.

| | | |
|---|---|---|
| *H04N 7/173* | (2011.01) | |
| *H04N 21/431* | (2011.01) | |
| *H04H 20/10* | (2008.01) | |
| *H04H 20/40* | (2008.01) | |
| *H04H 60/76* | (2008.01) | |
| *H04N 7/088* | (2006.01) | |
| *H04N 21/426* | (2011.01) | |
| *H04N 21/43* | (2011.01) | |
| *H04N 21/432* | (2011.01) | |
| *H04N 21/433* | (2011.01) | |
| *H04N 21/84* | (2011.01) | |
| *H04N 21/435* | (2011.01) | |
| *H04N 21/438* | (2011.01) | |
| *H04N 21/478* | (2011.01) | |
| *H04N 21/81* | (2011.01) | |
| *H04N 7/08* | (2006.01) | |

(52) U.S. Cl.
CPC ............ *H04H 60/76* (2013.01); *H04N 7/0887* (2013.01); *H04N 7/17318* (2013.01); *H04N 21/42646* (2013.01); *H04N 21/4305* (2013.01); *H04N 21/438* (2013.01); *H04N 21/4325* (2013.01); *H04N 21/4334* (2013.01); *H04N 21/4351* (2013.01); *H04N 21/478* (2013.01); *H04N 21/8173* (2013.01); *H04N 21/84* (2013.01); *H04N 7/08* (2013.01)

(56) References Cited

U.S. PATENT DOCUMENTS

| | | | |
|---|---|---|---|
| 5,502,497 A | 3/1996 | Yamaashi et al. | |
| 5,541,662 A | 7/1996 | Adams et al. | |
| 5,701,383 A | 12/1997 | Russo et al. | |
| 5,724,103 A | 3/1998 | Batchelor | |
| 5,726,702 A | 3/1998 | Hamaguchi et al. | |
| 5,737,552 A | 4/1998 | LaVallee et al. | |
| 5,774,666 A | 6/1998 | Portuesi | |
| 5,886,731 A | 3/1999 | Ebisawa | |
| 5,917,830 A | 6/1999 | Chen et al. | |
| 6,029,045 A | 2/2000 | Picco et al. | |
| 6,035,304 A | 3/2000 | Machida et al. | |
| 6,137,486 A | 10/2000 | Yoshida et al. | |
| 6,490,272 B1 | 12/2002 | Ericksson | |
| 6,637,032 B1 * | 10/2003 | Feinleib ........................ 725/110 |
| 6,714,969 B1 | 3/2004 | Klein et al. | |
| 7,272,843 B1 | 9/2007 | Nejime et al. | |
| 2002/0032907 A1 | 3/2002 | Daniels | |
| 2002/0059575 A1 | 5/2002 | Watts et al. | |
| 2002/0191646 A1 | 12/2002 | Hyakutake et al. | |
| 2004/0088739 A1 | 5/2004 | Shimoji et al. | |
| 2007/0294741 A1 | 12/2007 | Nejime | |

FOREIGN PATENT DOCUMENTS

| | | |
|---|---|---|
| JP | 254646 | 2/1990 |
| JP | 09046447 | 2/1997 |
| JP | 09093563 | 4/1997 |
| JP | 9130346 | 5/1997 |
| JP | 09149328 | 6/1997 |
| JP | 1013811 | 1/1998 |
| JP | 1051752 | 2/1998 |
| JP | 10079711 | 3/1998 |
| JP | 10285460 | 10/1998 |
| JP | 11055636 | 2/1999 |
| JP | 9966722 | 12/1999 |
| WO | 9743855 | 11/1997 |

OTHER PUBLICATIONS

U.S. Pat. No. 6,035,304 corresponds to JP 10-13811.

* cited by examiner

Control table 303

| Partner program ID | Auxiliary information ID | Title | Storage location | Start time | End time | Time length |
|---|---|---|---|---|---|---|
| 1001 | 5001 | Cut scene 1 | Address 1 | 0:15:00 | 0:17:30 | 0:02:30 |
| 1001 | 5002 | Special CM | Address 2 | 0:40:30 | 0:41:30 | 0:01:00 |
| 1003 | 5003 | Player message | Address 3 | 1:00:00 | 1:10:00 | 0:10:00 |
|  |  |  |  |  |  |  |

Control table 501

| Program ID | Program name | Recording start time | Recording end time | Recording location |
|---|---|---|---|---|
| 1001 | News 1 | 0:00:00 | 0:30:00 | Address 1 |
| 1002 | Weather forecast | 0:00:00 | 0:14:55 | Address 2 |
| 1003 | Drama 1 | 0:10:15 | 1:49:45 | Address 3 |
|  |  |  |  |  |

FIG. 7(A)
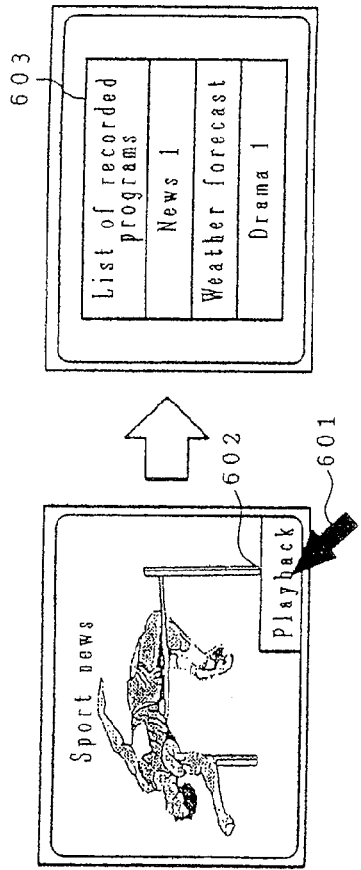
FIG. 7(B)
FIG. 7(C)
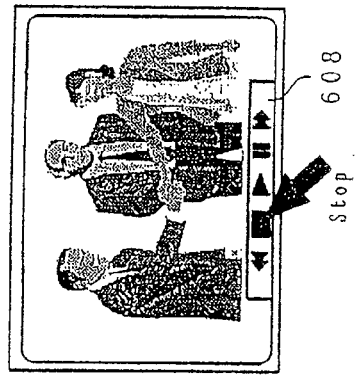
FIG. 7(D)
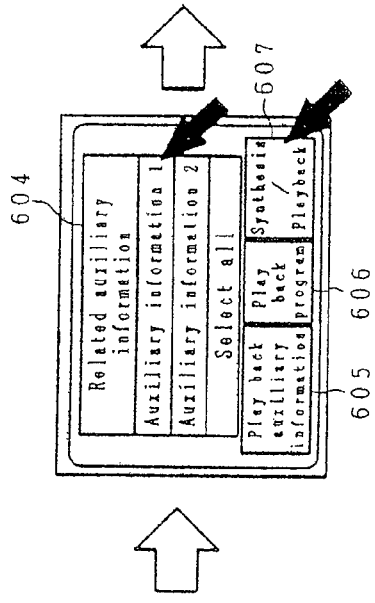

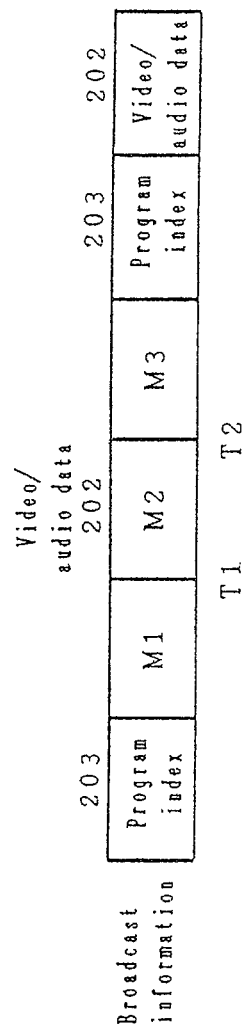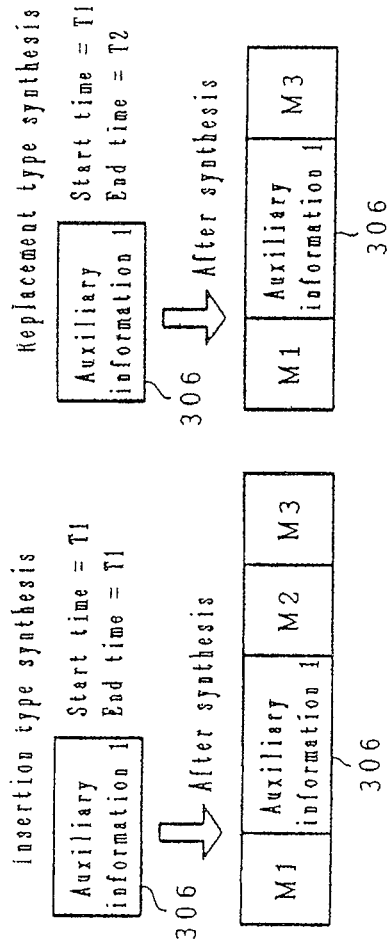
FIG. 8

BROADCASTING METHOD AND BROADCAST SIGNAL RECEIVING APPARATUS

The present application is a continuation of application Ser. No. 11/826,560, filed Jul. 17, 2007; which is a continuation of application Ser. No. 09/380,784, filed Sep. 9, 1999, now U.S. Pat. No. 7,272,843, the contents of which are incorporated herein by reference.

The present invention relates to a broadcasting method and a broadcast signal receiving apparatus for presenting video information, such as a picture, through a broadcasting network; and more particularly, the invention relates to a broadcasting method and a broadcast signal receiving apparatus wherein information presented through a broadcasting network and auxiliary information presented through other media, such as package media, can be watched and listened to in an interlocked manner.

BACKGROUND OF THE INVENTION

In a conventional system, video/audio information is edited so as to be broadcasted during a limited broadcasting period of time set as a program. Thus, the viewer can watch and listen to only that part of such video/audio information that is actually broadcasted by a broadcasting station. For example, in the case of a news program, it may be that only part of gathered news information can be watched and listened to due to such editing. In the case of a movie program, on the other hand, only part of a full length movie as presented at a movie theater can be watched during the period of a movie program, which is usually shorter than the show time of the movie at the movie theater.

Meanwhile, in recent years, there has been implemented a data broadcasting system whereby text data related to video/audio information is broadcasted as data in addition to the video/audio information by appending the text data in the blanking signal period of the video information. For example, systems called IT-vision and Intel-Intercast are known. In these data broadcasting systems, text data is described in a predetermined language, such as an HTML (Hyper Text Markup Language), in a video signal period of time, which is not used in the video transmission to be broadcasted, along with the video signal at the same time. An example of the signal period of time used for this purpose is the VBI (vertical blanking interval). In the broadcast signal receiving apparatus, incoming video/audio information and text data are separated from each other. The video/audio information is played back as it is, while the text data is displayed on a screen of the display unit as a message related to the video information, such as a text, a static picture or a graphic. In this way, the viewer is capable of not only watching and listening to the video/audio information, but also is capable of obtaining information on its program at the same time.

In a data broadcasting system whereby auxiliary information is broadcasted by using the VBI with a low information transmission capacity, however, there is a limit on the amount of auxiliary information that can be transmitted at one time, making it impossible to broadcast a large amount of data, such as video information, as auxiliary information. While video information and related information are broadcasted at the same time, they are independent of each other; and thus, it is difficult to utilize the related information in a process of synthesizing video information, such as a search for original information based on the related information and correlation of a scene cut out from a movie with the original movie.

SUMMARY OF THE INVENTION

It is an object of the present invention to provide the viewer with video/audio data which can not be included in broadcast information in the form of auxiliary information by adopting a broadcasting procedure different from the normal broadcasting procedure, wherein the auxiliary information is synthesized automatically in the broadcast signal receiving apparatus with the broadcast information to generate final information which appears to the viewer as if the final information had been broadcasted as a continuous single program.

According to the present invention, broadcast information received by the broadcast signal receiving apparatus during a predetermined program period of time is played back in a manner interlocked with auxiliary information received in advance and held in the receiving apparatus.

BRIEF DESCRIPTION OF THE DRAWINGS

Embodiments of the present invention will be described with reference to the accompanying drawings, wherein:

FIGS. 7(A) to 7(D) are diagrams which show a sequence of user operations;

FIG. 8 is a diagram which shows an example of broadcast information and FIGS. 8(A) and 8(B) are diagrams which illustrate different algorithms adopted by a video synthesizing unit for synthesizing broadcast information and auxiliary information;

BEST MODE FOR CARRYING OUT THE INVENTION

Figure 1:
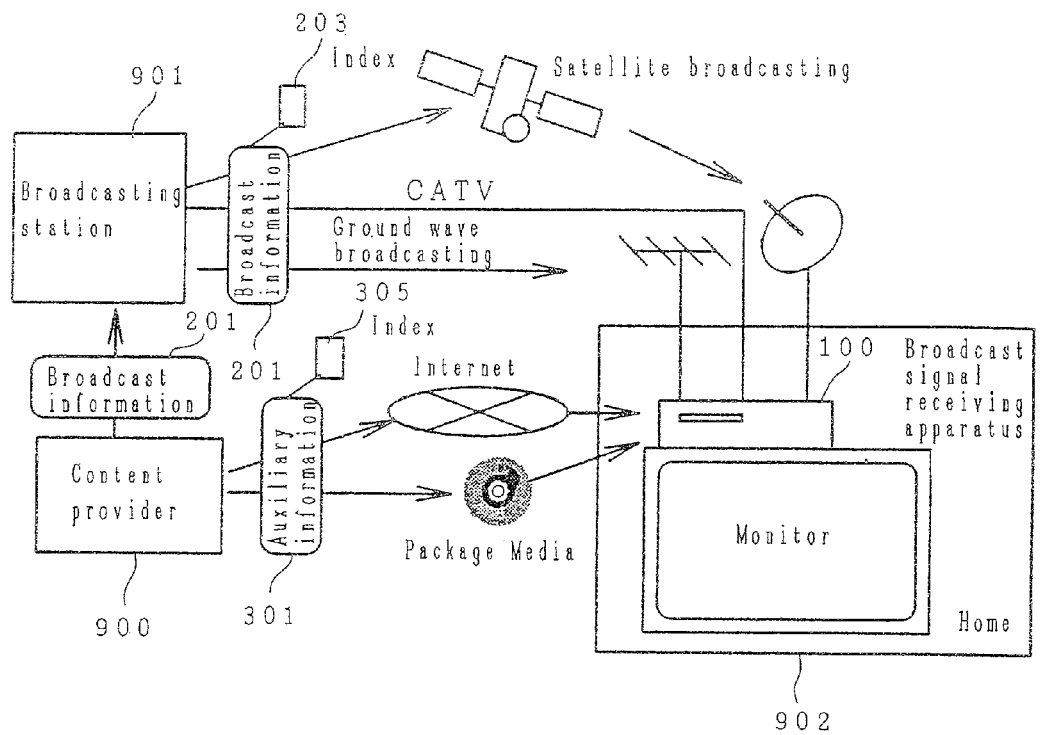
FIG. 1 is a schematic block diagram of a package media interlocked broadcasting/watching/listening system.

FIG. 1 will be referred to in order to explain the concept of a package media interlocked broadcasting/watching/listening system. In the system, the contents of a broadcast program are created by a contents provider 900 and the contents are partly delivered to a broadcasting station 901 as broadcast information 201. The broadcasting station 901 broadcasts the broadcast information 201 through an infrastructure, such as a satellite, a ground wave facility or a CATV. The contents provider 900 also distributes other information related to the broadcast information 201, through the Internet and a package media, as auxiliary information 301. The viewer side (at a home 902) receives the broadcast information 201 and the auxiliary information 301 through a broadcast signal receiving apparatus 100 and displays the information on a monitor.

In the package media interlocked broadcasting/watching/listening system, auxiliary information 301 supplements broadcast information 201. Both auxiliary information 301 and broadcast information 201 include indexes 305 and 203, respectively, for associating the former with the latter and for specifying how and with what timing the former supplements the latter.

The following is a description of an example to which the package media interlocked broadcasting/watching/listening system is applied. When distributing the contents of a large size theater movie, scenes in the movie are cut out by the broadcast information contents provider 900 to correspond to a length adjusted to a predetermined broadcast time. The contents provider 900 delivers the movie-through-the-cutting-process to a broadcasting station, as broadcast information, which is to be broadcasted to various homes. On the other hand, the cut out scenes are sent to the homes as auxiliary information through other means, such as the Internet, package media and data broadcasting systems. A broadcast signal receiving apparatus at each home receives the broadcast information and the auxiliary information and, thereafter, displays both pieces of information on a monitor in an interlocked manner based on indexes appended to both. This enables the viewer to watch and listen to the contents of the complete movie. In a news program, part of the news not broadcasted can also be presented to the viewer as auxiliary information. As a result, there is born a new information distribution business for distributing and delivering more detailed subjects, which are not broadcasted as a news program, as auxiliary information in the way described above.

The package media interlocked broadcasting/watching/listening system can also be applied to parental control. A parental control function prevents pictures and expressions of the original work which may be inappropriate for juvenile viewers from being displayed. To be more specific, portions of the original work for general viewers are broadcasted as broadcast information whereas scenes for adult viewers are only delivered separately as auxiliary information, typically by using package media. This allows the viewer to select whether or not such auxiliary information is to be displayed at the time of viewing a broadcast program, implementing the parental control function to appropriately exclude such scenes from displayed information. Thus, the chances that scenes inappropriate for juvenile viewers are inadvertently watched and listened to are eliminated.

Moreover, the package media interlocked broadcasting/watching/listening system can also be applied to broadcast advertisements (CMs). More particularly, by delivering a CM such as a product advertisement as auxiliary information, the CM can be played back properly in synchronization with a program. As a result, the number of opportunities in which a product advertisement is presented to the viewer in addition to the CMs included in the broadcast information can be increased. By setting an auxiliary information CM time in addition to the traditional CM time, the broadcasting station is able to increase its advertisement revenue. In addition, the CM provider is capable of appending a CM relevant to a program to the program broadcasted by a broadcasting station that does not broadcast the CM. For example, an index of the name of a program included in broadcast information can be used to play back an advertisement of a product, such as a car appearing in the program, from a CD-ROM with timing specified by the index. In this way, the CM provider is capable of letting the viewer watch and listen to a CM even if the broadcast station does not broadcast the CM.

The following is a description of an application of computer graphics to the package media interlocked broadcasting/watching/listening system. If the playback apparatus includes a processor that is capable of executing a program, auxiliary information played back in a manner interlocked with an operation to display broadcast information will not be limited to the video and audio data described above. For example, a CG program, i.e., a program displaying computer graphics (CG), can be provided as auxiliary information. That is, a CG program can be delivered as auxiliary information by using package media. Invocation of a CG program is triggered by index information included in the broadcast information. By providing a parameter required for a CG program from the broadcast information, a CG character moving synchronously with the broadcasting is allowed to appear on a displayed screen of the broadcast information. Such an application is particularly effective for programs, such as animation. The viewer is capable of carrying out operations, such as replacing some characters appearing in an animation program with CG characters selected from package media. If the viewer is also capable of creating a CG character, the viewer will be able to enjoy seeing a CG character created by himself or herself appearing and acting in a broadcasted program. Such a joy can not be realized by the conventional TV broadcasting.

In the mean time, standardization, including one known as MPEG4, has made progress in recent years. In the video and audio encoding field, a technology called content based encoding has been implemented. The content based encoding is a technology wherein video materials (or objects) included in video data is encoded independently, and, on the receiving side, the objects are decoded individually and finally synthesized before being displayed. In this technology, since only information on objects that change in the video data is transmitted, not only is it possible to considerably reduce the amount of information to be transmitted, but other advantages can also be attained by a video data producer. The other advantages include a capability of creating entirely new video data by a combination of pieces of video data of objects photographed individually. With this content based encoding used in the transmission of broadcast information, if the package media interlocked broadcasting/watching/listening system using a broadcast signal receiving apparatus provided by the present invention is adopted, video data of some objects included in a broadcast signal can be replaced by video data of other objects recorded in a piece of exactly corresponding information recorded on package media.

For example, video data of a $1^{st}$ person appearing in a program and video data of a $2^{nd}$ person other than the $1^{st}$ person are each subjected to content base encoding with the $2^{nd}$ person closely imitating behaviors of the $1^{st}$ person. The encoded data of the $1^{st}$ person is broadcasted as part of broadcast information, while the encoded video data of the $2^{nd}$ person is recorded on package media for distribution. If only the broadcast information is received and played back, the $1^{st}$ person will appear in a program as it is along with other objects, such as a background. If the broadcast information is played back in a manner interlocked with the package media, on the other hand, the viewer will be capable of watching and listening to video data wherein the $1^{st}$ person is replaced by the $2^{nd}$ person.

The following is a description of a broadcast signal receiving apparatus of the present invention which makes the package media interlocked broadcasting/watching/listening system described above feasible.

Figure 2:
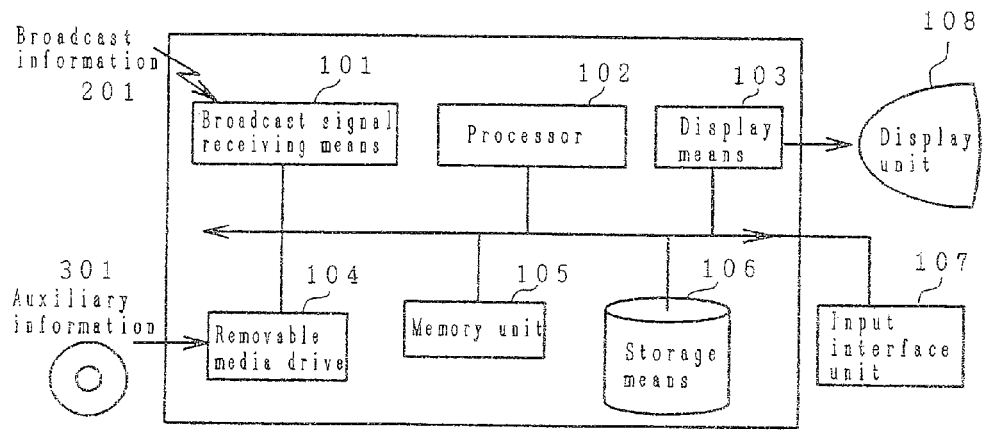
FIG. 2 is a block diagram of a 1st embodiment implementing a broadcast signal receiving apparatus.

FIG. 2 shows the system configuration of a 1st embodiment implementing a broadcast signal receiving apparatus 100 provided by the present invention. As shown in the figure, the broadcast signal receiving apparatus 100 comprises:

a broadcast signal receiving means 101 for receiving broadcast information 201;

a storage means 106, such as a hard disc drive, for temporarily storing broadcast information 201 received by the broadcast signal receiving means;

a removable media drive 104 for inputting auxiliary information 301;

an input means 107 for inputting a user intention;

a processor 102 for carrying out processing to convert broadcast information 201 and auxiliary information 301 into a video signal;

a display unit 108, such as a color monitor, for displaying information;

a display means 103 for converting video data generated by the processor 102 into a signal to be displayed on the display unit 108; and a memory unit 105 used for storing programs to be executed by the processor 102 and for temporarily storing data in the course of signal processing carried out by the processor 102.

While it is desirable to put a mountable as well as removable random-access medium, such as a CD-ROM, a DVD and an MO, in the removable media drive 104, a sequential medium, such as a tape is also acceptable as well.

Broadcast information 201 is stored in the storage means 106 in program units. When the viewer watches and listens to a program, broadcast information 201 stored in the storage means 106 is transferred to the processor 102, which then carries out processing, such as decoding, on the broadcast information 201 using the memory unit 105 as a work area. A result of the processing is then output to the display means 103. If an index is extracted from the broadcast information 201 during the processing, auxiliary information 301 indicated by the index is read out from a medium mounted on the removable media drive 104. Processing is then carried out on the auxiliary information 301 and a result of the processing is output also to the display means 103.

It should be noted that the means used for furnishing auxiliary information 301 are not limited to media such as a CD-ROM. Auxiliary information 301 can also be supplied to the broadcast signal receiving apparatus 100 byway of a network such as the Internet or a data broadcasting system such as a satellite broadcasting system or a ground wave broadcasting system. In this case, auxiliary information 301 received from a partner on the Internet or a broadcasting station of the data broadcasting system is transferred to the storage means 106 or the memory unit 105 shown in FIG. 2 to be stored therein. In either case, the auxiliary information 301 stored in the recording means 106 or the memory unit 105 is played back in a manner interlocked with broadcast information 201.

Figure 3:
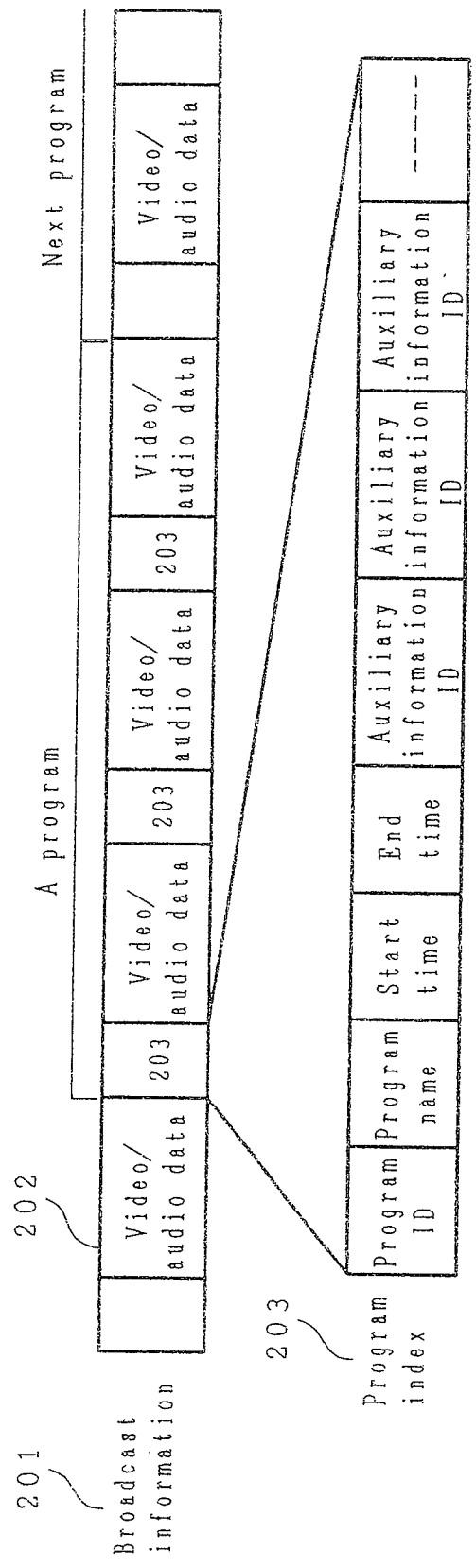
FIG. 3 is a diagram which shows the data format of broadcast information received by the 1st embodiment.

FIG. 3 shows the data format of broadcast information 201 received by the 1st embodiment. As shown in the figure, a plurality of program indexes 203 are inserted between pieces of video and audio data in each program. Each of the program indexes 203 includes information, such as a program ID 204 for uniquely identifying a broadcast program, a program name 205 given to the program, a start time 206 of the program, an end time 207 of the program and one or more auxiliary information IDs 208 each for identifying a piece of auxiliary information 301 to be interlocked during an operation to play back the program. In the case of an analog broadcast signal, a program index 203 is embedded in a VBI region of the video signal by using the ordinary NTSC system video signal. In the case of a digital broadcast signal, on the other hand, a program index 203 is broadcasted as a control packet other than the video signal.

It is desirable to insert a plurality of program indexes 203 into a program. This is because, if a program index 203 is inserted into only the head of a program, no program index 203 can be acquired in a recording or playback operation of the program starting from a position after the single program index 203, making it impossible to play back the program in a mode interlocked with auxiliary information 301 with the auxiliary information 301 used as a supplement to broadcast information 201. By inserting a plurality of program indexes 203 into a program, however, this problem can be solved. A program index 203 may include auxiliary information IDs 208 of all pieces of auxiliary information 301 to be interlocked with the program or include auxiliary information IDs 208 of only pieces of auxiliary information 301 to be interlocked with the program starting from a point into which the program index 203 is inserted.

Figures 4, 5, 6:
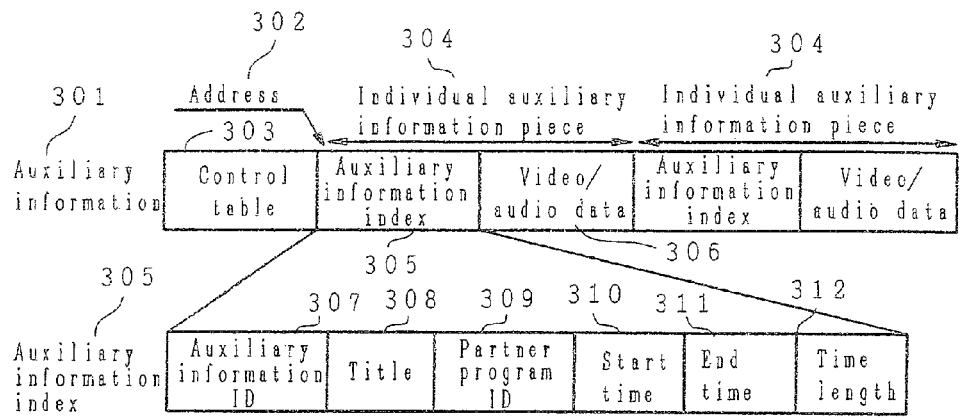
FIG. 4 is a diagram which shows the data format of auxiliary information received by the 1st embodiment.
FIG. 5 shows a typical data format of an auxiliary information control table.
FIG. 6 shows a typical video recording control table.

FIG. 4 shows the data format of auxiliary information 301 received by the 1st embodiment. As shown in the figure, auxiliary information 301 comprises a plurality of individual auxiliary information pieces 304 and an auxiliary information control table 303 for centrally controlling the individual auxiliary information pieces 304. Each of the individual auxiliary information pieces 304 comprises audio/video data 306 and an auxiliary information index 305 including information for identifying a partner program to be supplemented by the video/audio data 306. The auxiliary information index 305 comprises an auxiliary information ID 307 for distinguishing the individual auxiliary information pieces 304 from each other, the title 308 of the individual auxiliary information piece 304, a partner program ID 309 for identifying a partner program to be supplemented by the video/audio data 306, a supplementation start time 310 with the beginning of a partner program to be supplemented taken as a base, supplementation end time 311 and time length information 312 of the individual auxiliary information piece 304.

FIG. 5 shows a typical data format of the auxiliary information control table 303. As shown in the figure, the auxiliary information control table 303 is a single collection of attributes of auxiliary information indexes 305 of all individual auxiliary information pieces 304 and storage locations 401. That is, each line of the auxiliary information control table 303 comprises attributes of an auxiliary information index 305 and one storage location 401. A storage location 401 is an address in a medium or a storage device at which the video/audio data 306 of the individual auxiliary information piece 304 is stored. The auxiliary information indexes 305 cataloged in the auxiliary information control table 303 are sorted by partner ID 309. Note that it is desirable to automatically copy the auxiliary information table 303 into the storage means 306 at the time the medium storing the auxiliary information table 303 is mounted on the removable media drive 104. With the auxiliary information control table 303 copied into the storage means 106, a search of the table 303 for a desired piece of information can be carried out at a high speed.

Next, a package media interlocked broadcasting/watching/listening method will be explained. The package media interlocked broadcasting/is watching/listening method comprises the steps of:

carrying out a recording operation to record broadcast information 201 into the storage means 106; and carrying out a synthesis/playback operation to play back a program while supplementing the broadcast information 201 with individual auxiliary information pieces 304.

First of all, the recording operation will be explained with reference to FIGS. 2 to 6. The viewer records broadcast information 201 into the storage means 106 in the same way as a TV program is recorded into a VTR (video tape recorder). In the case of a storage means 106 implemented by a digital information storage means, such as a hard disc, an analog broadcast signal is converted into a digital signal, such as an MPEG stream, by a video capture in the broadcast signal receiving means 101, and the resulting digital signal is then stored in the storage means 106. The viewer is allowed to specify a recording time in the case of reserved recording or unattended recording, or to carry out a manual operation to start and end the recording. The processor 102 receives and stores incoming broadcast information 201 in accordance with a request coming from a timer not shown in the figure in the case of unattended recording or a request made by the viewer in the case of manual recording. At that time, the broadcast signal receiving apparatus 100 catalogs the recorded program into a video recording control table 501, a table for cataloging recorded programs, like one shown in FIG. 6. As shown in the figure, each line in the video recording table 201 comprises a program ID 204 as well as a program name 205 extracted from a program index 203 of the broadcast information 201, a recording start time 504, a recording end time 505 and a recording location 506 or an address in the storage means 106 indicating the beginning of an area for storing the broadcast information 201. It should be noted that the recording start time 504 and the recording end time 505 shown in the video recording control table 501 are times with a program start time 206 of the recorded program taken as a reference. That is to say, the recording start time 504 and the recording end time 505 are obtained by subtracting the program start time 206 from the time the recording is actually started and the time the recording is actually ended, respectively.

Next, a typical synthesis/playback operation will be explained with reference to FIGS. 2 to 7. In order to obtain individual auxiliary information pieces 304 to be used for supplementing a program, a recording medium containing auxiliary information 301 is mounted on the removable media drive 104. When the recording operation described above is not carried out, the broadcast signal receiving apparatus 100 carries out a through operation wherein the processor 102 processes incoming broadcast information 201 and displays the processed broadcast information on the display unit 108 by way of the display means 103 as is the case with an operation to receive an ordinary television broadcast program. For control purposes, the processor 102 displays a playback button 602 on the screen of the display unit 108 as shown in FIG. 7A.

When the viewer selects the playback button 602 by using a cursor 601 or presses a playback request button provided on the input means 107, such as a remote controller, the broadcast signal receiving apparatus 100 displays a recorded program menu 603 created at that time from the video recording control table 501 on the display unit 108 in order to let the viewer select a program recorded in the storage unit 106 to be played back. The viewer then selects a desired recorded program from the recorded program menu 603 as shown in FIG. 7B by specifying the program name thereof. When the name of the desired recorded program is specified, the video recording control table 501 is searched for the name 205 of the desired program and the program ID 204 thereof is acquired.

Next, the processor 102 forms a decision as to whether or not auxiliary information 201 can be acquired from a recording medium mounted on the removable media driver 104. The decision is formed by determining whether or not the program ID 204 of the selected program acquired from the video recording control table 501 exits as a partner program ID 309 in the auxiliary information control table 303 which was copied from the recording medium into the storage means 106 when the recording medium was mounted on the removable media drive 104 for the first time. If the outcome of the decision indicates that auxiliary information 201 can not be acquired, that is, if no partner program ID 309 in the auxiliary information control table 303 matches the program ID 204, supplementation of the program by auxiliary information 201 is ignored. The processor 102 then searches the video recording control table 501 using the program ID 204 as a key for the recording location 506. Subsequently, the processor 102 reads out the program from the location 506 to play it back. If the outcome of the decision indicates that auxiliary information 201 can be acquired, that is, if a partner program ID 309 in the auxiliary information control table 303 matches the program ID 204, on the other hand, the matching partner program ID 309 is used for fetching attributes 307 to 312 and storage locations 401 of each auxiliary information index 305 associated with the desired program to be played back from the auxiliary information control table 303. An auxiliary information menu 604, shown in FIG. 7C, is then displayed on the screen. It should be noted more than one auxiliary information index 305 in the auxiliary information control table 303 may have a partner program ID 309 matching the program ID 204, that is, more than one individual auxiliary information piece 304 may be associated with the desired program. As shown in FIG. 7C, the auxiliary information menu 604 includes a table of individual auxiliary information pieces 304 associated with the desired program and a 'Select all' button which is operated if it is desired to specify all of the individual auxiliary information pieces 304. Beneath the auxiliary information menu 604, the following buttons 605 to 607 are also displayed on the screen shown in FIG. 7C. The 'Play back auxiliary information' button 605 is selected if it is desired to play back only the individual auxiliary information pieces 304. On the other hand, the 'Playback program' button 606 is selected if it is desired to play back the broadcast information 201 only, ignoring the individual auxiliary information pieces 304. Finally, the 'Synthesis/Playback' button 607 is selected if it is desired to play back the program by supplementing the broadcast information 201 of the program with the individual auxiliary information pieces 304.

Assume that the viewer selects an 'auxiliary information 1' item representing one of the individual auxiliary information pieces 304 listed on the auxiliary information menu 604 and the 'Synthesis/Playback' button 607. In this case, the processor 102 searches the video recording control table 501 using the program ID 204 as a key for a recording location 506, a recording start time 504 and a recording end time 505 of the specific broadcast information 201 to be played back. Then, the processor 102 searches the auxiliary information control table 303 for a recording location 401 of the individual auxiliary information piece 304 corresponding to the 'auxiliary information 1' selected from the auxiliary information menu 604 to be synthesized and played back with the specific broadcast information 201, a supplementation start time 310 and a supplementation end time 311 of the individual auxiliary information piece 304 used in the synthesized playback.

The recording start time 504 of the specific broadcast information 201 to be played back is compared with the supplementation start time 310 of the individual auxiliary information piece 304 to be synthesized. Since the recording start time 504 and the synthesis start time 310 are both given with the program start time taken as a reference, the comparison can be decided to be justifiable. Video and audio data of the information with the smaller start time is played back as shown in FIG. 7D.

An individual auxiliary information piece 304 is played back as follows. The processor 102 compares the supplementation start time 310 of the individual auxiliary information piece 304 with the contents of a timer also taking the program start time as a reference all of the time.

When the contents of the timer become equal to the supplementation start time 310, the operation to play back the broadcast information 201 is temporarily suspended and an operation to play back the individual auxiliary information piece 304 is started. When the operation to play back the individual auxiliary information piece 304 is finished, the operation to play back the broadcast information 201 is resumed beginning with a portion at the supplementation start time 310 or the supplementation end time 311 of the individual auxiliary information piece 304. If the operation to play back the broadcast information 201 is resumed beginning with a portion at the supplementation start time 310, the individual auxiliary information piece 304 is merely inserted into the broadcast information 201. A method of synthesis to insert an individual auxiliary information piece 304 into broadcast information 201 is referred to as an insertion type synthesis method. If the operation to play back the broadcast information 201 is resumed beginning with a portion at the supplementation end time 311, on the other hand, the individual auxiliary information piece 304 replaces part of the broadcast information 201 between the supplementation start time 310 and the supplementation end time 311. A method of synthesis to replace part of broadcast information 201 with an individual auxiliary information piece 304, is referred to as a replacement type synthesis method. The insertion type synthesis method and the replacement type synthesis method will be exemplified in concrete terms later.

If the 'Play back auxiliary information' button 605 shown in FIG. 7C is selected by the user, only individual auxiliary information pieces 304 are played back sequentially one piece after another beginning with the one with the smallest supplementation start time 310 shown in the auxiliary information control table 303. If the 'Play back program' button 606 shown in FIG. 7C is selected by the user, on the other hand, only the broadcast information 201 selected from the menu shown in FIG. 7B is played back. In addition, interface buttons 608 resembling buttons on a remote controller used for controlling an ordinary VTR are displayed on the screen as shown in FIG. 7D. The interface buttons 608 allow the user to specify operations to start, halt, temporarily halt, fast forward and rewind the playback of the video data. When the user specifies the operation to halt the operation by operating one of the interface buttons 608, the broadcast signal receiving apparatus 100 terminates the operation to play back video data and resets the timer.

In the above description, it is assumed that a method is used whereby broadcast information 201 is recorded into the storage means 106 shown in FIG. 2 in program units, and, in an operation to play back a program, broadcast information 201 of the program is synthesized with auxiliary information 301. If the read/write speed of a hard disc drive used as the storage means 106 is not high enough to keep up with the recording and playback operations, however, part of the memory unit 105 can be used as a buffer between the processor 102 and the storage means 106. The buffer allows the operations to record broadcast and play back information 201 into and from the storage means 106 to appear as if they were carried out concurrently. As a result, the package media interlocked broadcasting/watching/listening method can be applied to a program which is currently being broadcasted.

The buffer cited above works as follows. Broadcast information 201 received by the broadcast signal receiving means 101 is stored in a 1st buffer area in the memory unit 105. As the amount of stored broadcast information 201 reaches a predetermined value, the broadcast information 201 is transferred to the storage means 106 at one time as a batch. While the transfer is being carried out, the operation to store broadcast information 201 received by the broadcast signal receiving means 101 can be continued. In the mean time, broadcast information 201 transferred to and recorded in the storage means 106 is transferred back to a 2nd buffer area in the memory unit 105 in appropriate units to be played back. Pieces of broadcast information 201 in the 2nd buffer area are sequentially processed one piece after another by the processor 102 and output to the display means 103. In this way, while currently broadcasted information 201 is being recorded in the storage means 106, a playback operation can be continued with a time delay to a certain degree. While such simultaneous recording and playback operations are being carried out in this way, auxiliary information 301 can be used as a supplement in accordance with program indexes included in the broadcast information 201 being played back. Time delays result due to supplementation by using auxiliary information 301. However, such time delays can be absorbed by the simultaneous recording and playback operations. If the insertion type synthesis method described above is taken as a technique of supplementation, the time delay between broadcast information being recorded and the information 201 being played back is widened. If the capacity of the storage means 106 is larger than a size corresponding to the time delay, however, there will be no missed information at all.

FIG. 8 shows an example of broadcast information, and FIGS. 8A and 8B show two different algorithms adopted in a synthesis of broadcast information 201 and auxiliary information 301. To be more specific, FIG. 8A is a diagram showing the insertion type synthesis method, and FIG. 8B shows the replacement type synthesis method. As shown in FIG. 8A, in the case of the insertion type synthesis method, the broadcast signal receiving unit 100 plays back auxiliary information 1 denoted by reference numeral 306 after playing back video and audio data 202 of broadcast information 201 denoted in FIG. 8 by notation M1 up to a point of time T1. After the operation to play back auxiliary information 1 is finished, the operation to play back the video and audio data 202 of the broadcast information 201 is resumed starting with a portion M2 at the point of time T1. In this way, auxiliary information 1 is merely inserted at the point of time Ti into the video and audio data 202 of the original broadcast information 201. In the case of the replacement type synthesis method shown in FIG. 8B, on the other hand, as the operation to playback the auxiliary information 1 is finished at a point of time T2; the operation to play back the video and audio data 202 of the broadcast information 201 is resumed starting with a portion M3 at the point of time T2. In this way, auxiliary information 1 replaces the portion M2 between the points of time T1 and T2 of the video and audio data 202 of the original broadcast information 201.

It should be noted that, in an effort made in the actual implementation to adjust timing in a playback operation, auxiliary information 301 is read out earlier than an accurate start time and stored in a cache memory. By doing so, the auxiliary information 301 can be played back with good timing without causing the viewer to feel a sense of incompatibility. In addition, if interframe encoding is carried out to produce an MPEG stream, a frame on an encoding boundary, that is, an I frame in the case of MPEG encoding, is adjusted to coincide with a boundary between broadcast information 201 and auxiliary information 301.

Figure 9:
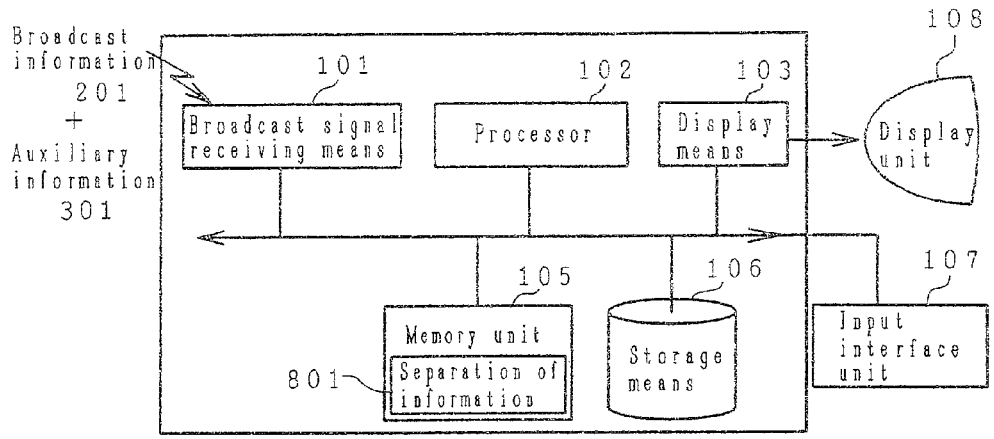
FIG. 9 is a block diagram of a 2nd embodiment implementing a broadcast signal receiving apparatus.

Next, a 2nd embodiment implementing a broadcast signal receiving apparatus provided by the present invention will be explained. In the case of the 2nd embodiment, auxiliary information 301 is also transmitted in the same way as broadcast information 201 instead of being provided by means of a recording medium. FIG. 9 shows the system configuration of the 2nd embodiment. Since auxiliary information 301 is also transmitted as is the case with broadcast information 201, as shown in the figure, the 2nd embodiment is obtained by omitting the removable media drive 104 from the system configuration of the 1st embodiment shown in FIG. 2. Instead, an information separating program 801 stored in the memory unit 105 is used for separating auxiliary information 301 from broadcast information 201 received by the broadcast signal receiving means 101. A method for acquiring auxiliary information 301 in an operation to record video data is also different from that adopted in the 1st embodiment implementing the broadcast signal receiving apparatus 100 shown in FIG. 2.

Figure 10:
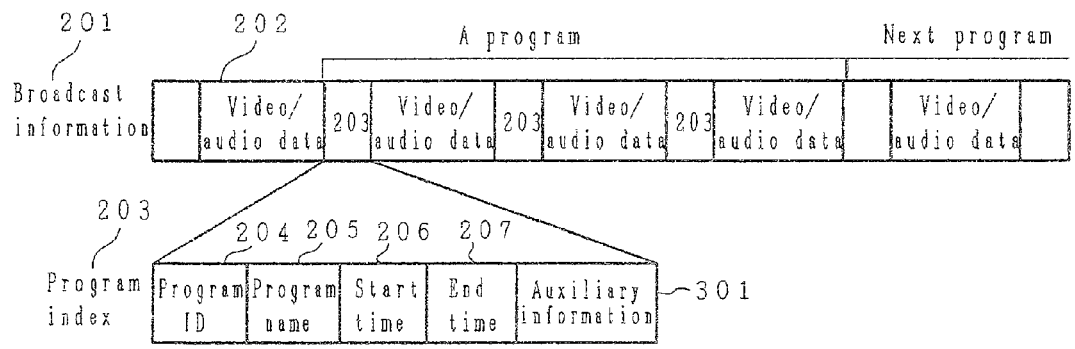
FIG. 10 is a diagram which shows the data format of broadcast information and auxiliary information received by the 2nd embodiment.

An operation to record video data carried out in the 2nd embodiment will be explained. The broadcast signal receiving apparatus 100 receives broadcast information 201 and auxiliary information 301 relevant thereto, both of which are transmitted by a broadcasting station. FIG. 10 shows the data format of the broadcast information 201 and the auxiliary information 201 received by the 2nd embodiment. Tile auxiliary information 301 is embedded in a program index 203. The processor 102 executes the program 801 to extract auxiliary information 301 from information received by the broadcast signal receiving means 101 and to store the information in the storage means 106.

It should be noted that, in some cases, a large amount of auxiliary information 301 can not be transmitted by including the auxiliary information 301 in a program index 203 of broadcast information 201 as shown in FIG. 10 due to broadcasting specifications. In such a case, auxiliary information 301 is transmitted by splitting it into a plurality of packets. Typically, such packets are transmitted in advance independently of the associated broadcast information 201 prior to the time band of the program of the broadcast information 201. The processor 102 employed in the broadcast signal receiving apparatus 100 stores auxiliary information 301 included in each packet. As the last packet is received, pieces of auxiliary information 301 are arranged in an order of sequence numbers included in the packets to reconstruct the entire auxiliary information 301. The 2nd embodiment allows the viewer to automatically acquire auxiliary information 301 by receiving a broadcast signal without the need to resort to another means such as a recording medium used in the 1st embodiment for distributing auxiliary information 301.

Figure 11:
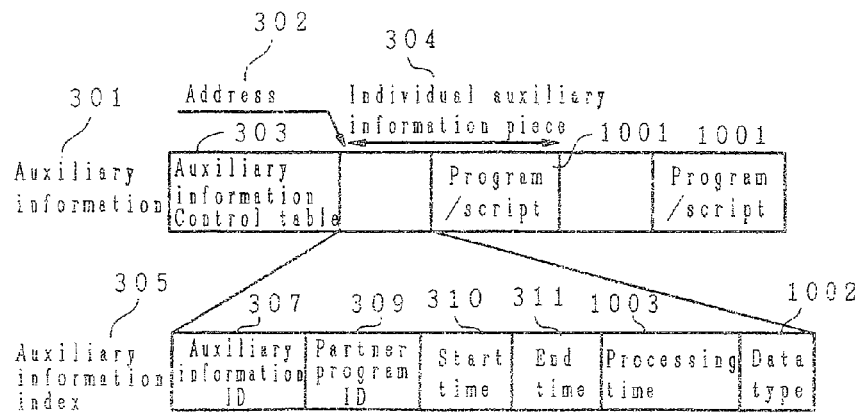
FIG. 11 is a diagram which shows the data format of auxiliary information handled in a 3rd embodiment.

Next, a $3^{rd}$ embodiment of the present invention will be explained. In the case of the $3^{rd}$ embodiment, the contents of auxiliary information 301 are a CG program, a sentence written in HTML or an operation described as a script. In one typical version of the 3rd embodiment, link information described in HTML is received as auxiliary information 301. Video data generated by a source on the Internet is then acquired by tracing the link and is displayed by executing a browser program. In another typical version of the $3^{rd}$ embodiment, a program for generating and displaying CGs (computer graphics) is received as auxiliary information 301. Then, by directly executing this CG program, CG video data can be displayed. FIG. 11 shows the data format of auxiliary information 301 handled by the $3^{rd}$ embodiment. As shown in the figure, an individual auxiliary information piece 304 comprises an auxiliary information index 305 and a program or a script 1001. The auxiliary information index 305 includes a data type field 1002 indicating the data type of the program or the script 1001. When executing a program or a script 1001, the processor 102 refers to the data type field 1002 and adjusts the execution of the program or the script 1001 to the data type specified in the field 1002.

Unlike an operation to play back video and audio data, the execution time of a program or a script greatly depends on the performance of the processor 102 carrying out the processing and the complexity of the network including the data source indicated by a link specified as auxiliary information 301. It is thus difficult to estimate the length of the execution time. For this reason, the auxiliary information index 305 includes a processing time field 1003. A positive value set in this processing time field 1003 is an effective period of time during which a result of execution of the program or the script 1001 is to be displayed. When the period of time lapses, the operation of the broadcast signal receiving apparatus is automatically switched to an operation to play back the video and audio data 202 of the broadcast information 201 of the program. On the other hand, a negative value set in this processing time field 1003 indicates that the execution of the program or the script 1001 is to be continued up to an instruction to end the execution is issued by the viewer. Thus, in the case of a positive value set in this processing time field 1003, the processor 102 keeps monitoring the execution time while the program or the script 1002 of auxiliary information 201 is being executed. By virtue of the $3^{rd}$ embodiment, it becomes possible to provide the viewer with auxiliary information 301 including computer graphics, numbers, texts and figures in addition to video data by using various kinds of media.

The present invention makes a package media interlocked broadcasting/watching/listening system feasible. In the package media interlocked broadcasting/watching/listening system auxiliary information relevant to broadcast information is distributed by using for example package media and, by playing back and displaying the auxiliary information and the broadcast information synchronously, the broadcast information can be supplemented with the auxiliary information.

What is claimed is:

1. A video information displaying comprising:
   receiving a program or a script via a first transmission path;
   receiving video information via a second transmission path;
   displaying the video information at a first point in time;
   executing the program or the script to obtain information via a network at a second point in time; and
   resulting in a situation of a plurality of situations, based on a state of the network, the plurality of situations including:
   a first situation in which the information obtained before a timeout processing occurring via the network is displayed at least as a part of a display image simultaneously with at least a part of the video information; and
   a second situation in which execution of the program or the script to obtain the information for display is stopped by the timeout processing without obtaining the information to be displayed, via the network.

2. A video information displaying method according to claim 1, wherein the stopping of the execution of the program or the script is conducted even if an instruction for the stopping of the execution of the program or the script is not inputted.

3. A video information displaying method according to claim 2, wherein the information obtained via the network includes computer graphics, numbers, texts or figures.

4. A video information displaying method according to claim 2, wherein the first transmission path includes a network path, and wherein the second transmission path includes a broadcast path.

5. A video receiving apparatus, comprising:
a receiver or a plurality of receivers configured to:
receive a program or a script via a first transmission path, and
receive video information via a second transmission path;
a processor configured to execute the program or the script; and
a video data generator configured to generate video data to be displayed;
wherein the video data generator is configured to generates video data including the video information at a first point in time,
wherein the processor is configured to executes the program or the script to obtain information via a network at a second point in time, and
wherein operation of the video data generator and the processor results in a situation of a plurality of situations, based on a state of the network, the plurality of situations including:
a first situation in which the information obtained before a timeout processing occurring via the network is included in the video data generated by the video data generator as a part of a display image in the video data in order for the information to be displayed simultaneously with at least a part of the video information; and
a second situation in which the processor stops execution of the program or the script to obtain the information for display by the timeout processing without obtaining the information to be displayed, via the network.

6. A video receiving apparatus according to claim 5, further comprising:
an input unit configured to input an instruction from a user,
wherein the processor is configured to stops the execution of the program or the script even if an instruction for stopping the execution of the program or the script is not inputted.

7. A video receiving apparatus according to claim 6, wherein the information obtained via the network includes computer graphics, numbers, texts or figures.

8. A video receiving apparatus according to claim 6, wherein the first transmission path includes a network path, and Wherein the second transmission path includes a broadcast path.

9. A display apparatus, comprising:
a receiver or a plurality of receivers configured to:
receive a program or a script via a first transmission path and
receive video information via a second transmission path;
a processor configured to execute the program or the script; and
a display unit configured to display the video information,
wherein the display unit is configured to displays the video information at a first point in time,
wherein the processor is configured to executes the program or the script to obtain information via a network at a second point in time,
wherein operation of the display unit and the processor results in a situation, based on a state of the network, of a plurality of situations including:
a first situation in which the display unit is configured to displays the information obtained before a timeout processing occurring via the network at least as a part of a display image simultaneously with at least a part of the video information; and
a second situation in which the processor is configured to stops execution of the program or the script the information for display by the timeout processing without obtaining the information to be displayed, via the network.

10. A display apparatus according to claim 9, further comprising:
an input unit configured to input an instruction from a user,
wherein the processor is configured to stops the execution of the program or the script even if an instruction for stopping execution of the program or the script is not inputted.

11. A display apparatus according to claim 10, wherein the information obtained via the network includes computer graphics, numbers, texts or figures.

12. A display apparatus according to claim 10,
wherein the first transmission path includes a network path, and
wherein the second transmission path includes a broadcast path.

* * * * *